Sept. 12, 1944.  E. I. FULLER  2,357,946
DEHYDRATORS
Filed June 18, 1943  3 Sheets-Sheet 1
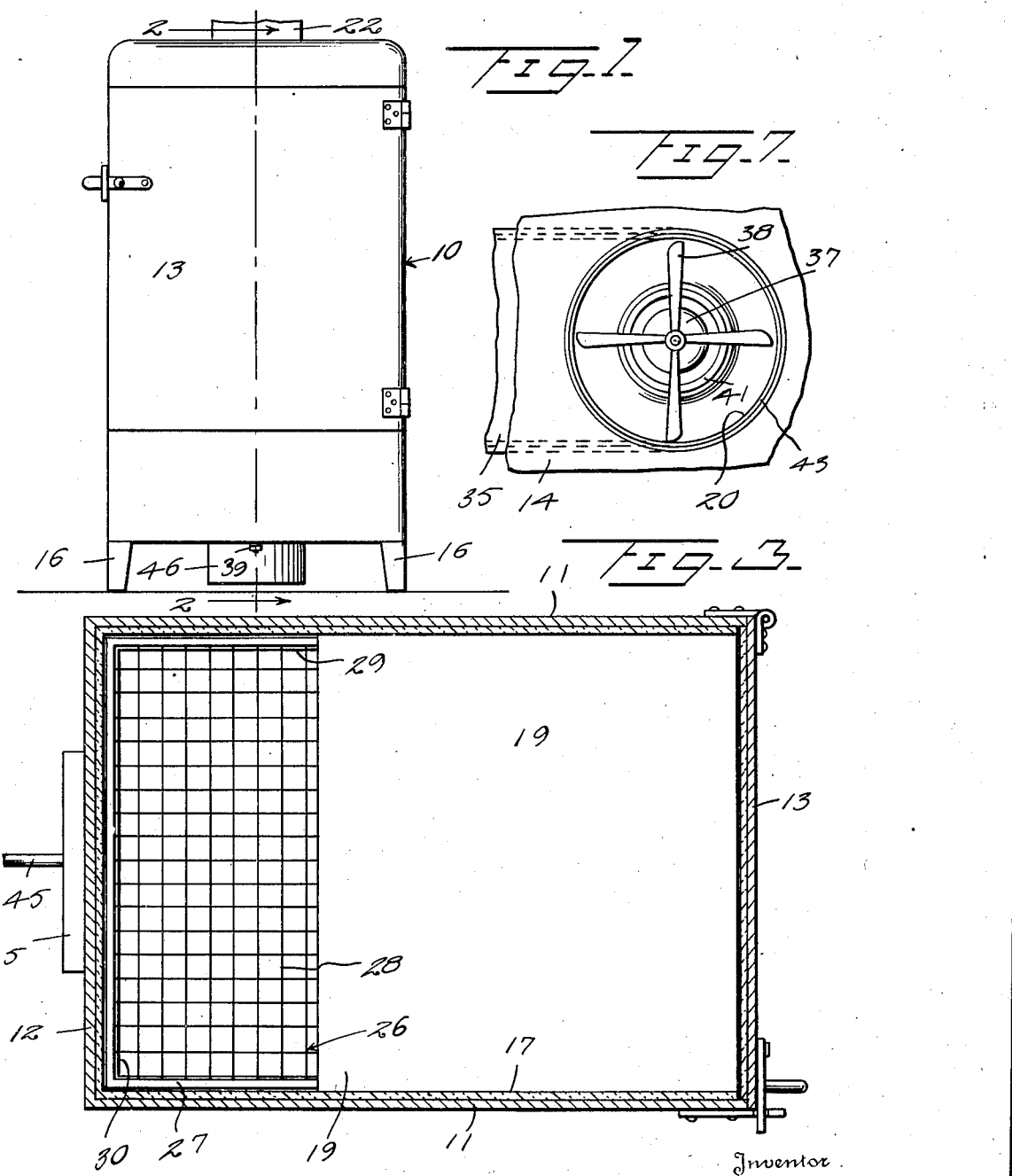
Inventor.
E. I. Fuller
By Kimmel & Crowell
Attorneys

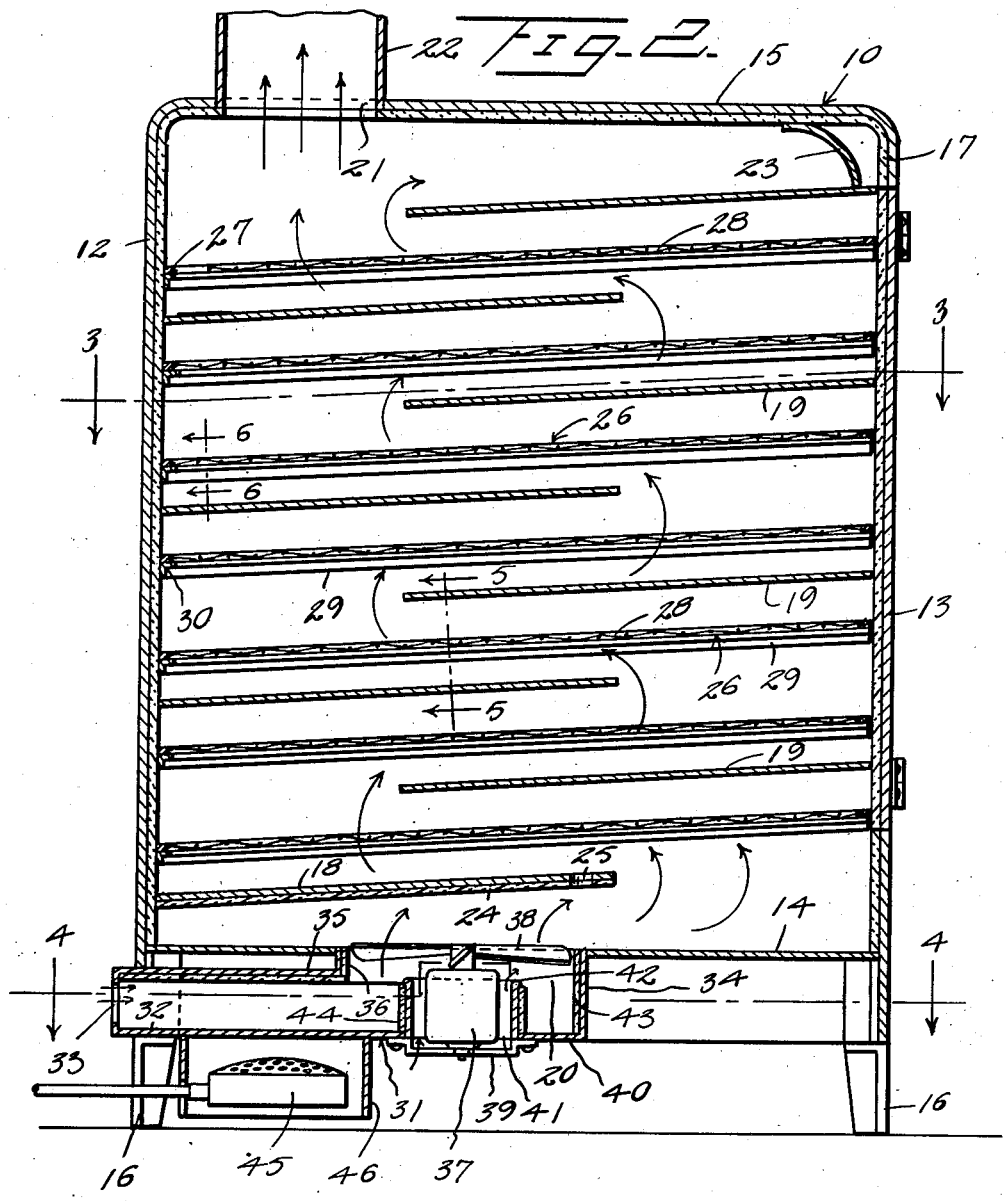

Sept. 12, 1944. E. I. FULLER 2,357,946
DEHYDRATORS
Filed June 18, 1943 3 Sheets-Sheet 3
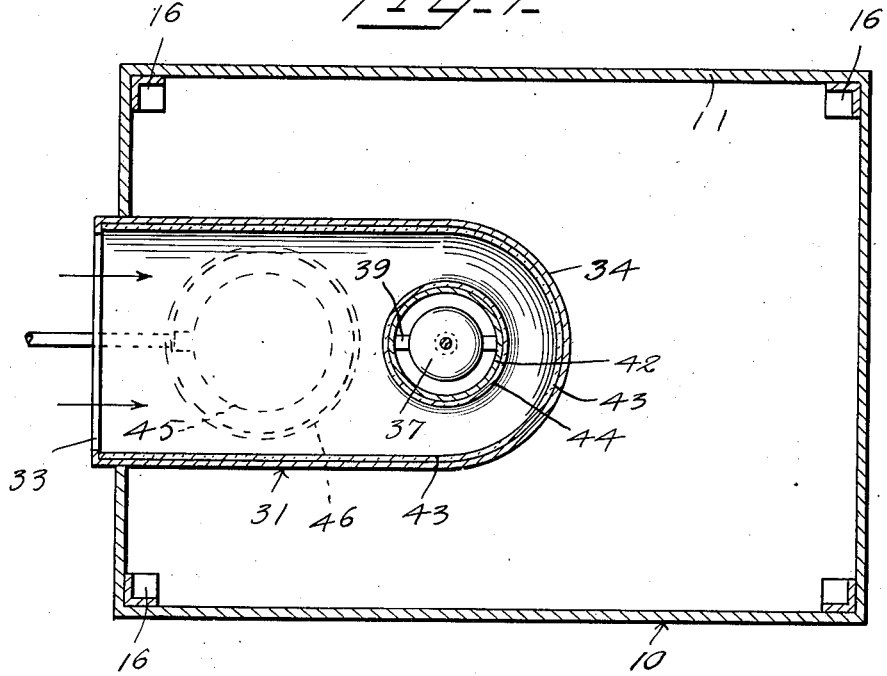
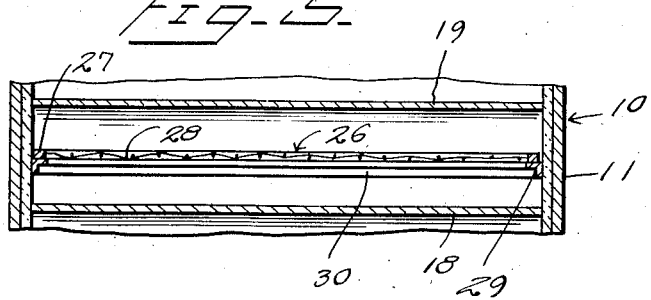
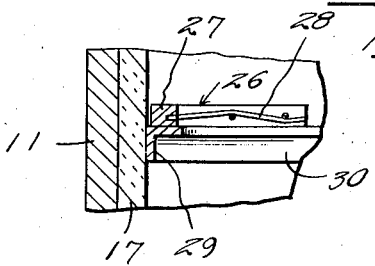
Inventor
E. I. Fuller
By Kimmel & Crowell
Attorneys Patented Sept. 12, 1944

2,357,946

UNITED STATES PATENT OFFICE 2,357,946

DEHYDRATOR

Edgar I. Fuller, Denver, Colo., assignor to Lauren Burt, Denver, Colo.

Application June 18, 1943, Serial No. 491,363

4 Claims. (Cl. 34—197)

This invention relates to dehydrators.

An object of this invention is to provide a dehydrator for food products which is simple in construction and operation and will effectively remove moisture from the food products.

Another object of this invention is to provide a dehydrator which includes a cabinet provided with a heating means in the lower portion thereof, a circulating fan for circulating the heated air, a plurality of baffles in the cabinet positioned so as to provide a tortuous passage, and a plurality of perforate trays removably mounted in the cabinet between the baffles.

A further object of this invention is to provide a dehydrator which can be effectively made in small size so as to be used in a community or small establishment the device being economical in operation and capable of dehydrating food products without case-hardening the products in a relatively short time.

With the foregoing objects in view and others which may hereinafter more fully appear, the invention consists of the novel construction, combination and arrangement of parts, as will be more specifically described, and illustrated in the accompanying drawings wherein are shown embodiments of the invention, but it is to be understood that changes, variations and modifications may be resorted to which fall within the scope of the invention as claimed.

In the drawings:

Figure 1 is a detail front elevation of a dehydrator constructed according to an embodiment of this invention;

Figure 2 is a sectional view taken on the line 2—2 of Figure 1;

Figure 3 is a sectional view taken on the line 3—3 of Figure 2;

Figure 4 is a sectional view taken on the line 4—4 of Figure 2;

Figure 5 is a sectional view taken on the line 5—5 of Figure 2;

Figure 6 is a sectional view taken on the line 6—6 of Figure 2; and

Figure 7 is a fragmentary plan view of the bottom of the cabinet showing the air intake fan.

Referring to the drawings the numeral 10 designates generally a cabinet which is formed of upright side walls 11, a rear wall 12, a closure 13 on the front of the cabinet, a bottom wall 14 and a top wall 15. The cabinet 10 is supported above a plane surface by means of supporting legs 16. The interior of the cabinet 10 is adapted to be insulated by means of insulating lining 17 which may be formed of asbestos or other heat insulating means.

The cabinet 10 has secured to the side and rear walls thereof, a plurality of vertically spaced apart baffles 18. The baffles 18 are inclined to the horizontal being inclined from the front to the rear and terminate at their forward ends at a point rearwardly from the closure 13. A second series of baffles 19 are secured between the side walls 11 of the cabinet and extend from the front toward the rear being inclined inwardly and downwardly and disposed alternately between the baffles 18. The rear ends of the baffles 19 are disposed forwardly from the rear wall 12 so that the two series of baffles 18 and 19 form a tortuous air duct or passage within the cabinet. The bottom wall 14 of the cabinet is formed with an opening 20 which constitutes an air intake opening and the top wall 15 of the cabinet is formed with an outlet opening 21 and preferably a pipe 22 is connected to the top wall 15 for taking off the air discharged through the opening 21. The cabinet 10 has secured in the upper portion thereof, an arcuate transversely extending baffle 23 which is secured adjacent the forward end of the uppermost baffle 19 and has the concave side thereof innermost so as to prevent the pocketing of any heated air in the upper forward portion of the cabinet.

The lowermost baffle 18 is provided with a heat insulating lining 24 on the lower side thereof and the lowermost baffle 18 is also formed with a plurality of holes 25 adjacent the forward end thereof for admitting air above the lowermost baffle 18 at a point rearwardly from the forward end thereof.

A plurality of perforate trays 26 are disposed between the baffles 18 and 19 and each tray comprises a rectangular frame 27 and a screen or perforate element 28 secured within the frame 27. The trays 26 are removably supported on angle supporting members which include side supporting angle members 29 and rear angle supporting members 30. The supporting members for the trays 26 are disposed in substantially parallel relation to the baffles 18 and 19, being inclined inwardly and downwardly from the front of the cabinet. The articles to be dehydrated are placed on top of the trays 26 and the trays then placed in the cabinet 10 on the supporting members 29 and 30.

In order to provide a means whereby heated air may be forced through the cabinet 10, I have provided an air duct 31 which is secured to the bottom wall 14. The air duct 31 includes a flat pipe 32 which is provided with an open rear end 33. The forward portion of the pipe 32 is curved, as shown at 34 in Figure 4, and the top wall 35 of the pipe 32 is formed with an extension or nipple 36 which is connected to the intake opening 20 so that air passing through the pipe 32 will enter the lower portion of the cabinet 10. A fan, including a motor 37 and fan blades 38, is supported within the forward end of the duct 31, the motor 37 being supported by a bracket or bar 39.

The bottom wall 40 of the pipe 32, is formed with an opening 41, and an upstanding nipple 42 extends upwardly from the opening 41. The motor 37 is loosely disposed within the nipple 42 so that air can pass through the nipple 42 and about the motor 37 in order to maintain the motor in a cooled condition.

Heat insulating lining 43 is disposed on the inner side of the air duct 31, being also disposed, as indicated at 44, about the outer surface of the nipple 42. The bottom wall 40 of the pipe 32 is preferably uninsulated and a heating member 45 is disposed below the bottom wall 40, rearwardly of the motor 37. The heating member 45 is mounted within a downwardly extending open housing 46 which is secured to the bottom wall 40 of the duct 31.

In the use and operation of this dehydrator the food products which are to be dehydrated are preferably initially blanched so as to provide a surface moisture on the products which will have a tendency to prevent case-hardening of the products during the time that such products are within the cabinet 10. The articles are placed on the trays 26 which may be removed from the cabinet 10 through the closure 13. The trays may then be inserted within the cabinet 10 and the heater 45 then operated so as to heat the air in the duct 31. The fan, including the motor 37 and the blades 38, is then operated so as to draw the air through the duct 31 including air through the space between the motor 37 and the nipple 42. The heated air which may be heated to the desired degree, is forced upwardly against the lowermost baffle 18, passing about the forward edge of this baffle and also a quantity of this heated air will pass upwardly through the openings 25. These openings 25 in the lowermost baffle may be of any desired size and number and positioned at the desired point or points rearwardly from the forward edge of the lowermost baffle 18. The heated air passing about the lowermost baffle 18 will pass through the lowermost tray 26, contacting the food products on the lowermost tray and will then move upwardly in a tortuous passage about the baffles 18 and 19, and through the remaining superposed spaced apart trays.

This dehydrator has been particularly designed as a fairly small unit which may be used by a small community or a small establishment and will provide a simple, efficient dehydrator which, in view of the initial blanching of the food products, will not produce a case-hardening of the products.

I claim:

1. A dehydrator comprising a cabinet, a closure at the front of said cabinet, said cabinet having a bottom wall provided with an intake opening, means discharging heated air into the cabinet through said intake opening, said cabinet also having an upper outlet opening, oppositely extending overlapping imperforate baffles fixed in said cabinet, a plurality of perforate trays, and means supporting said trays between said baffles.

2. A dehydrator comprising a cabinet, a closure a the front of said cabinet, said cabinet having a bottom wall provided with an intake opening, means discharging heated air into the cabinet through said intake opening, said cabinet also having an upper outlet opening, oppositely extending overlapping imperforate and inwardly inclined baffles fixed in said cabinet, said baffles being parallel and inclined to the horizontal a plurality of perforate trays and means supporting said trays between said baffles.

3. A dehydrator comprising a cabinet, a closure at the front of said cabinet, said cabinet having a lower intake opening and an upper outlet opening, opposed overlapping imperforate baffles fixed in said cabinet providing a tortuous air passage from said inlet to said outlet openings, a plurality of perforate trays, means supporting said trays in said cabinet between said baffles, an air duct below said cabinet, means connecting the inner end of said duct to said inlet opening, a circulating fan at the inner end of said duct for forcing air from said duct into said cabinet, and means heating the air passing through said duct.

4. A dehydrator comprising a cabinet, a heat insulating lining in said cabinet, said cabinet having a lower intake and an upper outlet, opposed vertically spaced apart overlapping baffles in said cabinet, an air duct below said cabinet communicating with said intake, a fan in said duct, means about said fan for admitting cool air about said fan, a heater below said duct, and a housing dependingly carried by said duct and enclosing said heater.

EDGAR I. FULLER.